(12) United States Patent
Li

(10) Patent No.: US 8,543,763 B2
(45) Date of Patent: Sep. 24, 2013

(54) REDUNDANT ARRAY OF INDEPENDENT DISKS RAID CONTROLLER AND SYSTEM

(71) Applicant: Huawei Technologies Co., Ltd., Guangdong (CN)

(72) Inventor: Yansong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/715,534

(22) Filed: Dec. 14, 2012

(65) Prior Publication Data

US 2013/0191592 A1 Jul. 25, 2013

Related U.S. Application Data

(63) Continuation of application No. PCT/CN2012/078925, filed on Jul. 20, 2012.

(30) Foreign Application Priority Data

Jan. 20, 2012 (CN) .......................... 2012 1 0018858

(51) Int. Cl.
*G06F 12/00* (2006.01)
*G06F 13/00* (2006.01)
*G06F 13/28* (2006.01)
*G06F 1/00* (2006.01)
*G06F 1/26* (2006.01)
*G06F 1/32* (2006.01)
*G06F 11/30* (2006.01)

(52) U.S. Cl.
USPC ........... 711/114; 711/154; 711/161; 713/310; 713/321; 713/322; 713/323; 713/324; 713/340

(58) Field of Classification Search
USPC ................ 711/114, 154, 161–162; 713/300, 713/310, 320–324, 330, 340
See application file for complete search history.

(56) References Cited

U.S. PATENT DOCUMENTS 5,513,361 A * 4/1996 Young ........................... 713/320
5,809,314 A * 9/1998 Carmean et al. ............... 713/322

(Continued)

FOREIGN PATENT DOCUMENTS

| CN | 101354606 A | 1/2009 |
| CN | 101419497 A | 4/2009 |
| CN | 101776983 A | 7/2010 |

OTHER PUBLICATIONS

International Search Report dated Nov. 8, 2012 in connection with International Patent Application No. PCT/CN2012/078925, 17 pages.

*Primary Examiner* — Ryan Bertram

(57) ABSTRACT

A redundant array of independent disks (RAID) controller includes a host interface, a processing core and a storage interface. The processing core is connected to a host and a hard disk. The RAID controller includes a halt control pin connected to the processing core and a control signal line in the host. The processing core receives a first level sent through the control signal line by the host when the hard disk is in a standby state, and halt an execution of a program in the processing core according to the first level; receives a second level sent through the control signal line by the host when the host receives a service request, and resume the execution of the program according to the second level; and receive the service request sent by the host and send the received service request to the hard disk to awaken the hard disk.

6 Claims, 1 Drawing Sheet

(56) References Cited

U.S. PATENT DOCUMENTS

| | | |
|---|---|---|
| 5,884,098 A | 3/1999 | Mason, Jr. |
| 2002/0020755 A1* | 2/2002 | Matsushita .................. 236/49.3 |
| 2005/0144486 A1* | 6/2005 | Komarla et al. .............. 713/300 |
| 2006/0282601 A1* | 12/2006 | Uchida ......................... 710/309 |
| 2009/0172443 A1* | 7/2009 | Rothman et al. .............. 713/323 |

* cited by examiner

REDUNDANT ARRAY OF INDEPENDENT DISKS RAID CONTROLLER AND SYSTEM

CROSS-REFERENCE TO RELATED APPLICATIONS

This application is a continuation of International Application No. PCT PCT/CN2012/078925, filed Jul. 20, 2012, titled "REDUNDANT ARRAY OF INDEPENDENT DISKS RAID CONTROLLER AND SYSTEM", which claims priority to Chinese Patent Application No. 201210018858.1, filed with the Chinese Patent Office on Jan. 20, 2012, and titled "REDUNDANT ARRAY OF INDEPENDENT DISKS RAID CONTROLLER AND SYSTEM", both of which are incorporated herein by reference in their entireties.

TECHNICAL FIELD

The present disclosure relates to the field of communications technologies, and in particular, to a redundant array of independent disks (RAID) controller and a system.

BACKGROUND

With the fast development of Internet services, the data volume borne, processed, and stored on a network also increases exponentially, imposing increasingly high requirements for the capacity, performance, and availability of the storage system. A storage medium commonly used by Internet servers and storage arrays is hard disk, for example, hard disk drive. However, the failure rate of hard disk drives is high, and the performance is low. Therefore, during actual applications, hard disk drives often use the Redundant Array of Independent Disks (RAID) mode. That is, a host controls the read/write operation of multiple hard disks through communication with a RAID controller.

As the number of hard disks is large, the full-load power consumption of all hard disks may account for over 20% of the total power consumption of an entire server or disk array. The power consumption of a hard disk in standby mode is low. For example, the read/write power consumption of a 2.5-inch hard disk drive of a certain model is 3.5 watts to 4.6 watts, but its power consumption in standby mode is only 1 watt. In the prior art, the host sets hard disks in the standby state in idle hours, thereby significantly reducing the power consumption of a single device and the cooling system in the equipment room.

During the running process, however, the RAID controller will regularly, for example, at an interval of 3 minutes, scan hard disks and execute certain fault detection operations. In this case, hard disks will be abnormally awakened shortly after entering the standby state even in idle hours, reducing the energy conservation effects.

SUMMARY

To improve the energy conservation effects, aspects of the present invention provide a redundant array of independent disks (RAID) controller and a system. The technical solutions are as follows:

According to one aspect of the present invention, a RAID controller is provided. The RAID controller includes a host interface, a processing core, and a storage interface.

The processing core is connected to a host through the host interface, and is connected to a hard disk through the storage interface.

The RAID controller includes a halt control pin connected to a control signal line in the host and the processing core.

The processing core is configured to: when the hard disk is in a standby state, receive a first level sent by the host to the halt control pin through the control signal line, and halt an execution of a program in the processing core according to the first level received by the halt control pin, so as to halt an access to the hard disk.

The processing core is further configured to: when the host receives a service request, receive a second level sent by the host to the halt control pin, and resume the execution of the program according to the second level received by the halt control pin.

The processing core is further configured to receive, through the host interface, the service request sent by the host and send the received service request to the hard disk through the storage interface, to awaken the hard disk to execute an operation corresponding to the service request.

According to another aspect of the present invention, a control system is provided. The system includes a host, a RAID controller, and a hard disk.

The RAID controller includes a host interface, a processing core, and a storage interface.

The processing core is connected to the host through the host interface, and is connected to the hard disk through the storage interface.

The RAID controller includes a halt control pin connected to a control signal line in the host and the processing core.

The processing core is configured to: when the hard disk is in a standby state, receive a first level sent by the host to the halt control pin through the control signal line, and halt an execution of a program in the processing core according to the first level received by the halt control pin, so as to halt an access to the hard disk.

The processing core is further configured to: when the host receives a service request, receive a second level sent through the control signal by the host to the halt control pin through the control signal line, and resume the execution of the program according to the second level received by the halt control pin.

The processing core is further configured to receive, through the host interface, the service request sent by the host and send the received service request to the hard disk through the storage interface, to awaken the hard disk to execute an operation corresponding to the service request.

According to the technical solutions provided in some aspects of the present invention, the halt control pin of the RAID controller is connected to the control signal in the host and the processing core. When the hard disk is in the standby state, the processing core receives the first level sent by the host to the halt control pin through the control signal, and halts execution of a program in the processing core according to the first level received by the halt control pin, thereby halting access to the hard disk. In this manner, the hard disk remains in the standby state, and is not abnormally awakened. Compared with the prior art, the energy conservation effects are improved.

BRIEF DESCRIPTION OF THE DRAWINGS

To illustrate the technical solutions in the embodiments of the present invention more clearly, the following briefly describes the accompanying drawings for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

Embodiments of the present invention provide a redundant array of independent disks (RAID) controller and a system.

To make the objectives, technical solutions, and advantages of the present invention more comprehensible, the following describes the embodiments of the present invention in further detail with reference to the accompanying drawings.

Embodiment 1

Figure 1:
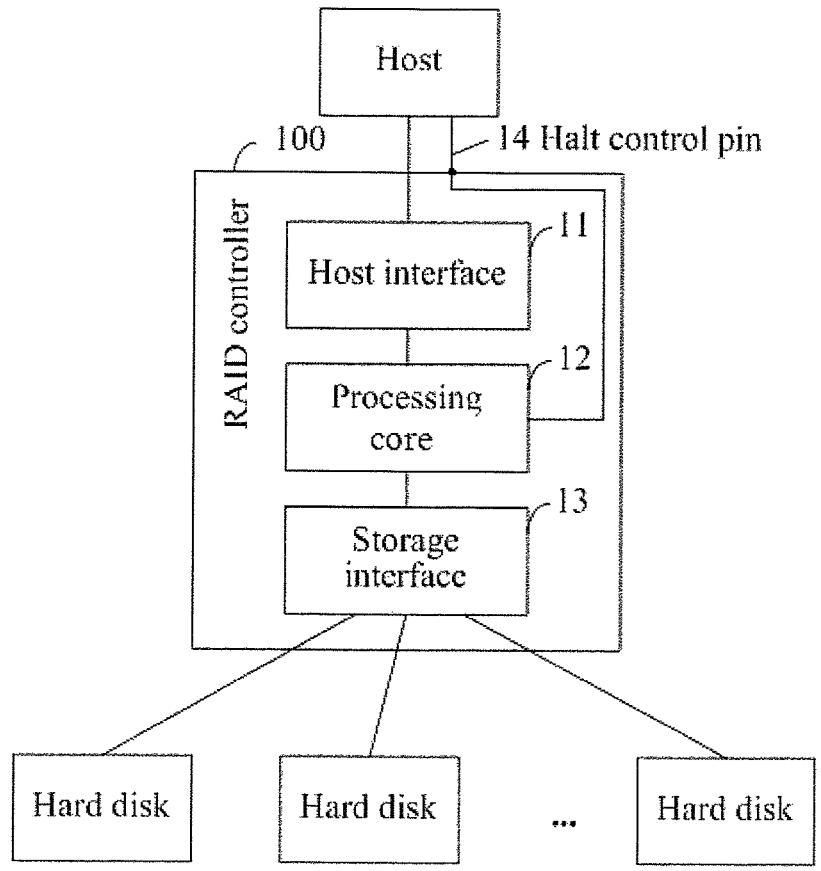
FIG. 1 is a block diagram of a redundant array of independent disks (RAID) controller according to a first embodiment of the present invention.

FIG. 1 is a schematic diagram of a RAID controller according to a first embodiment of the present invention. The RAID controller 100 includes:

a host interface 11, a processing core 12, and a storage interface 13.

The processing core is connected to a host through the host interface, and is configured to communicate with the host through the host interface.

The processing core is connected to at least one hard disk through the storage interface, and is configured to communicate with the at least one hard disk through the storage interface.

The RAID controller includes a halt control pin 14, where the halt control pin is connected to a control signal in the host and the processing core; when the halt control pin is at a first level, it is configured to make the processing core halt a program execution; when the halt control pin is at a second level, it is configured to make the processing core resume program execution from the previous halt.

The processing core is configured to: when the hard disk is in a standby state, receive the first level sent by the host to the halt control pin through the control signal, and halt running of a program in the processing core according to the first level received by the halt control pin, thereby halting access to the hard disk.

The processing core is further configured to: when the host receives a service request, receive the second level sent by the host to the halt control pin through the control signal, and resume execution of the program according to the second level received by the halt control pin.

The processing core is further configured to receive, through the host interface, the service request sent by the host and send the received service request to the hard disk through the storage interface, thereby awakening the hard disk and executing an operation corresponding to the service request.

According to this embodiment, the halt control pin of the RAID controller is connected to the control signal in the host and the processing core. When the hard disk is in the standby state, the processing core receives the first level sent by the host to the halt control pin through the control signal, and halts running of a program in the processing core according to the first level received by the halt control pin, thereby halting access to the hard disk. In this manner, the hard disk remains in the standby state, and is not abnormally awakened. Compared with the prior art, the energy conservation effects are improved.

Embodiment 2

As shown in FIG. 1, the RAID controller according to this embodiment maybe located in a circuit system designed by a user according to a RAID controller chip. Specifically, the user designs the circuit after purchasing the RAID controller chip, and then combines a Basic Input Output System (BIOS) and an application programming interface provided by a vendor with self-developed applications to form a complete circuit system; or the RAID controller according to this embodiment may be located on a RAID control card directly purchased from a vendor, and then applications are developed based on the application programming interface provided by the vendor.

To help persons skilled in the art better understand this embodiment, a detailed description is given below by taking a hard disk drive as an example. Specifically, the RAID controller includes: a host interface, a processing core, and a storage interface.

The processing core is connected to a host through the host interface, and is configured to communicate with the host through the host interface. Preferably, the host interface is a Peripheral Component Interconnect Express (PCIE) interface.

The processing core is connected to at least one hard disk drive through the storage interface, and is configured to communicate with the at least one hard disk drive through the storage interface. Preferably, the storage interface is a SAS (Serial Attached SCSI (Small Computer System Interface)) interface, or a Serial Advanced Technology Attachment (SATA) interface.

The RAID controller includes a halt control pin, where the halt control pin is connected to a control signal in the host and the processing core; when the halt control pin is at a first level, it is configured to make the processing core halt a program execution; when the halt control pin is at a second level, it is configured to make the processing core resume program execution from the previous halt. Preferably, the halt control pin includes: a halt (halt) pin or a stop clock (stpclk) pin (the signal pin type varies according to the chip type), but is not limited thereto, and all halt control pins that make the RAID controller halt running when the halt control pin is valid (e.g., first level), and be capable of quickly responding and resuming running when the halt control pin is invalid fall within the protection scope of the embodiments of the present invention.

The processing core is configured to: when the hard disk is in a standby state, receive the first level sent by the host to the halt control pin through the control signal, and halt running of a program in the processing core according to the first level received by the halt control pin, thereby halting access to the hard disk drive.

In this embodiment, the host first sets the hard disk drive to a standby state. Specifically, the host sends a standby (standby) command in an Advanced Technology Attachment (ATA) command set to the RAID controller. The RAID controller sends the standby command to the hard disk drive so that the hard disk drive enters the standby state. When the hard disk drive is in the standby state, the motor of the hard disk stops rotating, and the head is unloaded, but its interface circuit is still in an active state and may be awakened once the ATA command is received.

The host then judges whether the hard disk drive is in the standby state.

In actual applications, after the host sets the hard disk drive to the standby state, for better accuracy, the host may further confirm whether the hard disk drive is in the standby state again, which is specifically as follows: The host sends check power mode (check power mode) command information in the ATA command set to the RAID controller; the RAID controller sends the check power mode command information to the hard disk drive; the hard disk drive receives the check power mode command, generates a response value according to the check power mode command, and sends it to the RAID controller; the RAID controller sends the response value to the host. The host judges whether the hard disk drive is in the standby state according to the response value, which is specifically as follows: When the response value is 0x00, it indicates that the hard disk drive is in the standby state; when the response value is not 0x00, it indicates that the hard disk drive is not in the standby state, and the host needs to send the standby command to the hard disk drive for the hard disk drive to enter the standby state.

The response value may also be 0x80, 0xFF, and 0x40. When the response value is 0x80, it indicates that the hard disk drive is in an idle state. When the response value is 0xFF, it indicates that the hard disk drive is in an active state or idle state. When the response value is 0x40, it indicates that the motor is in the process of stopping rotating, that is, the hard disk drive is entering the standby state. Therefore, when the response value is 0x80, 0xFF, and 0x40, it indicates that the hard disk drive is not in the standby state.

When the hard disk drive is in the standby state, the host sends the first level to the halt control pin of the RAID controller through the control signal, and the RAID controller halts running of a program in the processing core according to the first level received by the halt control pin, thereby halting access to the hard disk.

In actual applications, the processing core of the RAID controller mostly uses the PowerPC series. For the processing core of this series, the processing core provides a dedicated debug interface, that is, halt control pin, which may be connected to an external debugger and control execution of software codes. In this embodiment, the halt pin is connected to the control signal in the host and the processing core.

When the halt pin is valid, that is, the halt pin is at the first level, the processing core enters a "debug halt state", and the processing core temporarily stops instruction fetch and instruction execution, but the clock of the processing core still runs, which is equivalent to a case where the processing core is frozen. When the halt pin is invalid, that is, the halt pin is at the second level, the processing core continues to run from the previous halt, and resumes instruction fetch and instruction execution. This embodiment may use this characteristic of the halt pin to avoid a case where the hard disk drive is abnormally awakened from the standby state and to ensure that the hard disk drive is capable of quick response when a service arrives.

If the processing core of the RAID controller may provide a stpclk pin, for example, an x86 processor may provide the stpclk pin, the stpclk pin of the RAID controller according to this embodiment may also be connected to the control signal of the host and the processing core. The RAID controller may halt running of the program in the processing core according to the first level received by the stpclk pin so that the hard disk drive remains in the standby state.

The stpclk pin is a halt clock pin and is mainly configured to reduce power consumption and implement energy conservation or over-temperature protection. When the stpclk pin is valid, if no other external interrupts exist, the processing core will stop at the next instruction, flush the internal pipeline and write buffer, disable the internal clock and finally enter a stop grant (stop grant) state. When the stpclk pin is invalid, the processing core restores the normal working state and resumes instruction fetch and instruction execution. Therefore, this embodiment may use this characteristic of the stpclk pin to halt running of the RAID controller, thereby avoiding a case where the hard disk drive is abnormally awakened from the standby state, and ensuring that the hard disk drive is capable of quick response when a service arrives.

When the processing core halts running, the host interface of the RAID controller still works properly. That is, the host can still detect the presence of the RAID controller, thereby avoiding adverse impact on host software.

The processing core is further configured to: when the host receives a service request, receive the second level sent through the control signal by the host to the halt control pin, and resume execution of the program according to the second level received by the halt control pin.

The processing core is further configured to receive, through the host interface, the service request sent by the host and send the received service request to the hard disk through the storage interface, thereby awakening the hard disk and executing an operation corresponding to the service request.

According to this embodiment, when a service arrives, and the host requests for accessing the hard disk drive, the host sends the second level to the halt control pin of the RAID controller through the control signal; the RAID controller resumes execution of the program according to the second level received by the halt control pin. Further, the processing core receives, through the host interface, the hard disk access request sent by the host, converts the hard disk access request into a read/write operation which is recognizable to the hard disk drive, that is, ATA command, and sends the ATA command to the hard disk through the storage interface to awaken the hard disk drive in the standby state. This awakening process is transparent to the host, and the host does not need to concern how the hard disk is awakened.

According to this embodiment, the hard disk will not be abnormally awakened after entering the standby state without changing RAID controller software (including application programming interface and BIOS), thereby ensuring the energy conservation effects.

The hard disk according to this embodiment is not limited to the hard disk drive, and may also be a solid state drive or other hard disks. The solid state drive is a hard disk made of a flash memory chip, which, different from the hard disk drive, does not have a rotating platter and a head, and therefore has better reliability, performance, power consumption, and environmental adaptability but a higher cost. It also supports the ATA command set, including commands for checking the power status and entering the standby state. Such a difference from the hard disk drive is transparent to the host.

In this embodiment, when the RAID controller is located on a RAID control card directly purchased from a vendor, the user (e.g., the system designer) may ask the vendor to lead the halt pin or stpclk pin of the RAID controller from a certain reserved pin on the connector of the RAID control card. The user connects it to the host part. In this manner, the host controls the operations of halting running and resuming running of the RAID controller through a halt signal or stpclk signal. This mode requires participation of the vendor in design modification, but the risks and workload compared with the case of software modification are low, and this way is more easily accepted by the vendor.

According to this embodiment, the halt control pin of the RAID controller is connected to the control signal in the host and the processing core. When the hard disk is in the standby state, the processing core receives the first level sent through the control signal by the host to the halt control pin, and halts running of a program in the processing core according to the first level received by the halt control pin, thereby halting access to the hard disk. In this manner, the hard disk remains in the standby state, and is not abnormally awakened. In the prior art, when the hard disk is in the standby state, the RAID controller will regularly scan the hard disk and execute certain fault detection operations, abnormally awakening the hard disk. Compared with the prior art, the present invention improves energy conservation effects.

In addition, this embodiment does not rely on the vendor to modify software, the workload is light, and the cost is low; the hard disk may exit the standby state in a timely manner and respond to service access in a timely manner.

Embodiment 3

Figure 2:
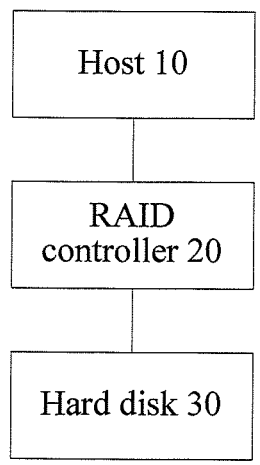
FIG. 2 is a block diagram of a control system according to a third embodiment of the present invention.

FIG. 2 is a structural schematic diagram of a control system according to a third embodiment of the present invention. The control system includes: a host 10, a RAID controller 20, and a hard disk 30.

The RAID controller 20 includes a host interface, a processing core, and a storage interface.

The processing core is connected to the host 10 through the host interface, and is configured to communicate with the host 10 through the host interface.

The processing core is connected to the at least one hard disk 30 through the storage interface, and is configured to communicate with the at least one hard disk 30 through the storage interface.

The RAID controller 20 includes a halt control pin, where the halt control pin is connected to a control signal in the host 10 and the processing core; when the halt control pin is at a first level, it is configured to make the processing core halt program execution; when the halt control pin is at a second level, it is configured to make the processing core resume program execution from the previous halt.

The processing core is configured to: when the hard disk 30 is in a standby state, receive the first level sent through the control signal by the host 10 to the halt control pin, and halt running of a program in the processing core according to the first level received by the halt control pin, thereby halting access to the hard disk 30.

The processing core is further configured to: when the host 10 receives a service request, receive the second level sent through the control signal by the host 10 to the halt control pin, and resume execution of the program according to the second level received by the halt control pin.

The processing core is further configured to receive, through the host interface, the service request sent by the host 10 and send the received service request to the hard disk 30 through the storage interface, thereby awakening the hard disk 30 and executing an operation corresponding to the service request.

Preferably, the host interface of the RAID controller is a peripheral component interconnect express (PCIE) interface.

The storage interface of the RAID controller is a serial attached small computer system interface, or a serial advanced technology attachment (SATA) interface.

Preferably, the halt control pin of the RAID controller includes: a halt (halt) pin or a stop clock (stpclk) pin.

The hard disk according to this embodiment includes a hard disk drive or a solid state drive.

According to this embodiment, the halt control pin of the RAID controller is connected to the control signal in the host and the processing core. When the hard disk is in the standby state, the processing core receives the first level sent through the control signal by the host to the halt control pin, and halts running of a program in the processing core according to the first level received by the halt control pin, thereby halting access to the hard disk. In this manner, the hard disk remains in the standby state, and is not abnormally awakened. Compared with the prior art, the energy conservation effects are improved, and the service life of the hard disk is prolonged.

In addition, this embodiment does not rely on the vendor to modify software, the workload is light, and the cost is low; the hard disk may exit the standby state in a timely manner and respond to service access in a timely manner.

It should be noted that, the embodiments in the present specification are described in progressive manner, with each embodiment emphasizing differences thereof from other embodiments, and for the same or similar parts, reference may be made among the embodiments. The apparatus embodiment is basically the same as the method embodiment, and is therefore described briefly. For the relevant parts in the apparatus embodiment, see the corresponding description in the method embodiment.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, a process, method, article, or device that includes a series of elements not only includes such elements, but also includes other elements not specified expressly, or may include inherent elements of the process, method, article, or device. If no more limitations are made, an element limited by "include a/an . . . " does not exclude other same elements existing in the process, method, article, or device which includes the element.

Persons of ordinary skill in the art should understand that all or apart of the steps of the foregoing embodiments maybe implemented through hardware, or may be implemented by a program instructing relevant hardware. The program may be stored in a computer readable storage medium. The storage medium may be a read-only memory, a magnetic disk, or an optical disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A redundant array of independent disks (RAID) controller, comprising: a host interface, a processing core, and a storage interface,
wherein the processing core is connected to a host through the host interface, and is connected to a hard disk through the storage interface,
wherein the RAID controller comprises a halt control pin connected to the processing core and a control signal line in the host,
wherein the processing core is configured to:
receive a command for checking a power mode of the hard disk from the host through the host interface after the host sets the hard disk to a standby state;
send the command to the hard disk through the storage interface;
receive a response value responsive to the command from the hard disk through the storage interface, wherein the response value indicates that the hard disk is in the standby state;
send the response value to the host through the host interface;

receive a first level sent through the control signal line by the host to the halt control pin when the hard disk is in the standby state, and halt an execution of a program in the processing core according to the first level so as to halt an access to the hard disk;

receive a second level sent through the control signal line by the host to the halt control pin when the host receives a service request, and resume the execution of the program according to the second level; and receive, through the host interface, the service request sent by the host and send the received service request to the hard disk through the storage interface, so as to awaken the hard disk to execute an operation corresponding to the service request.

2. The RAID controller according to claim 1, wherein:

the host interface is a peripheral component interconnect express (PCIE) interface; and the storage interface is a serial attached small computer system interface, or a serial advanced technology attachment (SATA) interface.

3. The RAID controller according to claim 1, wherein the halt control pin is any one of a halt pin or a stop clock pin.

4. A control system, comprising a host, a redundant array of independent disks (RAID) controller, and a hard disk, wherein the RAID controller comprises a host interface, a processing core, and a storage interface, wherein the processing core is connected to the host through the host interface, and is connected to the hard disk through the storage interface, wherein the RAID controller comprises a halt control pin connected to the processing core and a control signal line in the host, wherein the processing core is configured to:

receive a command for checking a power mode of the hard disk from the host through the host interface after the host sets the hard disk to a standby state;

send the command to the hard disk through the storage interface;

receive a response value responsive to the command from the hard disk through the storage interface;

send the response value to the host through the host interface, wherein the host is configured to confirm that the hard disk is in the standby state based on the response value;

receive a first level sent through the control signal line by the host to the halt control pin after the host confirms that the hard disk is in the standby state, and halt an execution of a program in the processing core according to the first level to halt an access to the hard disk;

receive a second level sent through the control signal line by the host to the halt control pin when the host receives a service request, and resume the execution of the program according to the second level; and receive, through the host interface, the service request sent by the host and send the received service request to the hard disk through the storage interface, so as to awaken the hard disk to execute an operation corresponding to the service request.

5. The system according to claim 4, wherein:

the host interface of the RAID controller is a peripheral component interconnect express (PCIE) interface; and the storage interface of the RAID controller is a serial attached small computer system interface, or a serial advanced technology attachment (SATA) interface.

6. The system according to claim 4, wherein the halt control pin of the RAID controller is any one of a halt pin or a stop clock pin.

* * * * *